United States Patent [19]

Graafmann

[11] 4,419,067
[45] Dec. 6, 1983

[54] DEVICE FOR CONNECTING PLASTICS TUBES BY HEATSEALING

[75] Inventor: Jurgen Graafmann, Ibbenburen, Fed. Rep. of Germany

[73] Assignee: Wavin B.V., Zwolle, Netherlands

[21] Appl. No.: 391,724

[22] Filed: Jun. 24, 1982

Related U.S. Application Data

[62] Division of Ser. No. 882,400, Mar. 1, 1978, abandoned, Ser. No. 111,172, Jan. 10, 1980, abandoned, and Ser. No. 257,187, Apr. 24, 1981, abandoned.

[30] Foreign Application Priority Data

Mar. 2, 1977 [DE] Fed. Rep. of Germany ....... 2708898

[51] Int. Cl.³ ............................................... B29C 17/00
[52] U.S. Cl. ................... 425/392; 156/294; 156/304.6; 156/309.9; 156/322; 156/500; 425/403
[58] Field of Search ............... 156/499, 322, 294, 500; 425/392, 403, 393; 156/304.6, 309.9

[56] References Cited

U.S. PATENT DOCUMENTS

| | | | |
|---|---|---|---|
| 3,087,390 | 4/1963 | Rusa | 425/393 |
| 3,753,640 | 8/1973 | Duepree | 425/392 |
| 3,817,677 | 6/1974 | Seefluth | 425/392 |
| 3,843,302 | 10/1974 | Petzetakis | 425/403 |
| 3,924,999 | 12/1975 | Harris et al. | 425/392 |
| 3,994,515 | 11/1976 | Cotton | 256/294 |
| 4,135,961 | 1/1979 | Yoshizawa et al. | 425/392 |

FOREIGN PATENT DOCUMENTS 2406661 8/1975 Fed. Rep. of Germany ...... 156/294

*Primary Examiner*—Jerome W. Massie
*Attorney, Agent, or Firm*—Wilkinson, Mawhinney & Theibault

[57] ABSTRACT

Method for connecting thin-walled plastic tubes by heat welding wherein a normal plastic tube is heated and provided with a funnel-shaped widening and another tube is heated and provided with a conical narrowing, the narrowing being pushed into the funnel-shaped widening so that these parts are heatsealed to each other.

2 Claims, 4 Drawing Figures

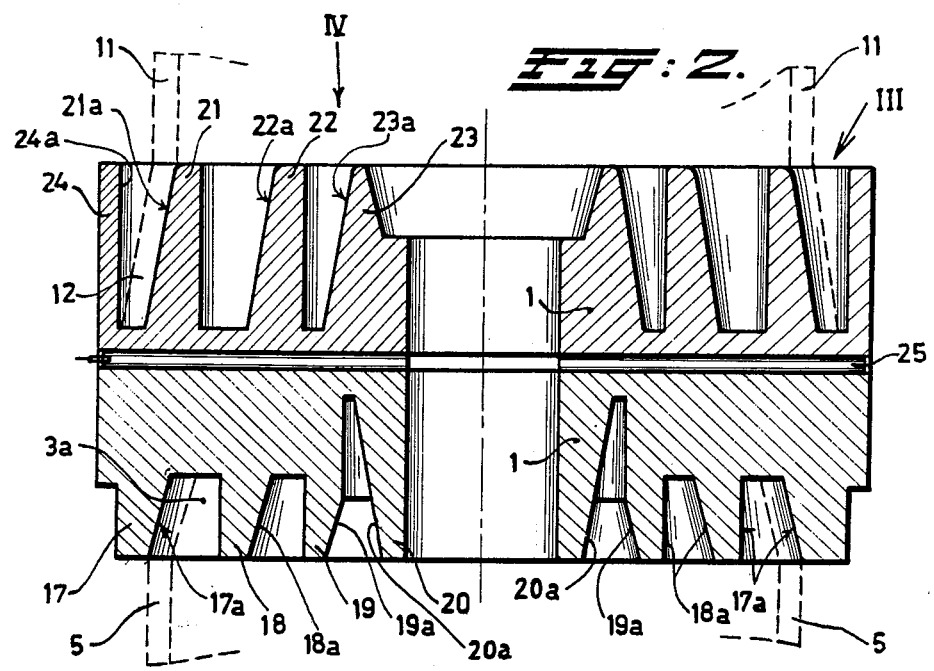
Fig. 2.
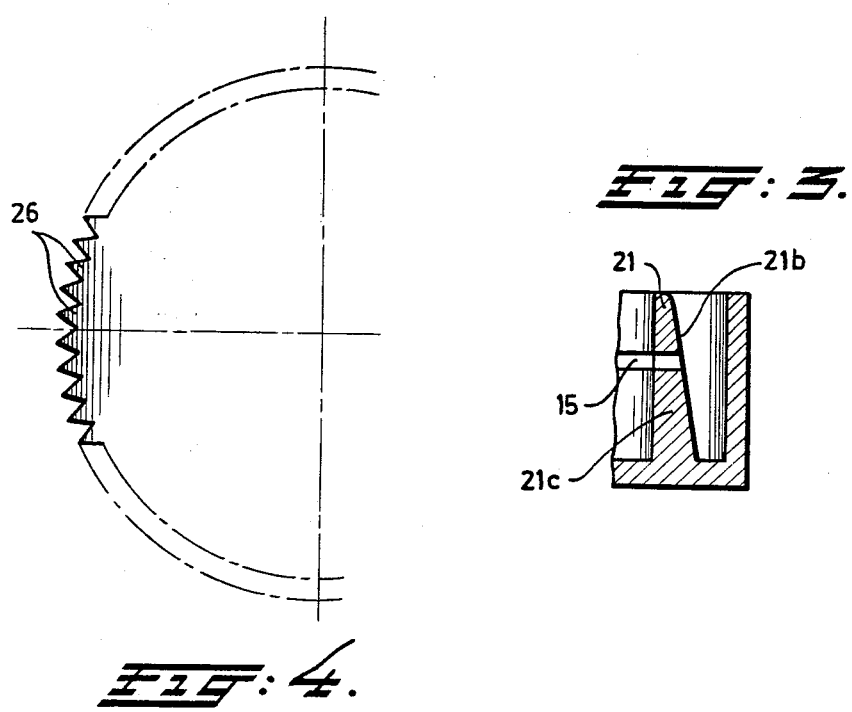
Fig. 3.
Fig. 4.

DEVICE FOR CONNECTING PLASTICS TUBES BY HEATSEALING

This application is a division of application Ser. Nos. 882,400, 111,172, 257,187, filed Mar. 1, 1978, Jan. 10, 1980, Apr. 24, 1981, (all abandoned).

BACKGROUND OF THE INVENTION

The present invention relates to a method of connecting plastic tubes in an overlapping way by heatsealing, whereby a surface of a first, widened plastics female tube part is heated to over the plasticizing temperature and is connected with a surface of a second plastic male tube part, said surface being heated identically to over the plasticizing temperature.

A method of this type over overlappingly connecting polyethylene tubes or polypropylene tubes by means of a heatsealing process, is known. When said known method is carried out, an initial plastic tube part is used having a socket-shaped or a funnel-shaped widening in which widening a second plastic tube part is received, whereafter the two plastic tube part are heatsealed together, so that they are connected, this owing to the properties of a plastic material. In order to carry out said joint the inner surface of the socket-shaped or funnel-shaped widening in the first plastic tube part and the outer side of the second plastic tube part are heated until both sides will partially melt and will present adhesive properties.

The aforedescribed method is inefficient and expensive, since the first tube part has to be provided in plants with a widening or muff in advance, while many portions cut off of such tubes can be used no longer, when such a plastic tube with a widening or muff has to be shortened. Moreover, said method cannot be used for thin-walled tubes.

Methods of overlappingly connecting particularly thin-walled plastic tubes by means of heatsealing are in great demand, as said method can be carried out at the location where plastic tubes are needed without necessarily using first tube parts having been provided with a machine-made widening in advance in plants.

SUMMARY OF THE INVENTION

The present invention now aims to provide a method no longer presenting the drawbacks mentioned before, whereby the desired widening can be provided at the site where the required tubes have to be installed and particularly thin-walled tubes can be connected in a very cheap way.

The invention thus relates to a method of connecting plastic tubes by means of heatsealing, whereby the internal face of a first widened plastic female tube part is heated up to the melting temperature and is joined with a correspondingly heated outer face of a second plastic male tube part by pressing the second tube part into the first tube part.

At the location of instalment of the tube or tubes, the end of a polypropylene or a polyethylene plastic tube part can be so widened that a second plastic tube part can easily be centered and be heatsealed together with the first tube part without any formation of undesired elevations or ridges which could lead to obstructions at the location of the heatseal or joint.

A further effect of the present method is that the round cross section of the tube will be maintained and that no oval shape of the tubes will occur, like is the case with joints obtained by a butt welding operation.

The widening is advantageously funnel-shaped, so that the second plastic tube part can be expediently centered with respect to the first plastic tube part, during the formation of a joint.

The first inner side of the widened part of the widening, adjoining the tube, should preferably be heated up to a temperature being lower than that of the end part of the widening directly adjoining the tube.

Owing hereto the second plastic tube part to be received in the widening, can be efficiently centered, since the part of the widening situated most inwardly will be less resilient than the extreme end part of the widening which, together with the second plastic tube part, will form the joint.

It has been found, that preferably a funnel-shaped widening should be formed, which has a top angle of less than 60° and preferably less than 40°, whilst an angle of some 20° has appeared to be very expedient.

With respect to the above angle, can still be quoted that experiments with widenings having a top angle of more than 60°, have proved to be ineffective. In that event the said formed widening will collapse, so that it is no longer possible to effect an appropriate joint or connection between the first and the second plastic tube part. During the heatsealing operation the second plastic tube part will preferably be provided at its extreme end with a narrowing adapted to the shape of a widening of the first tube part, preferably with a funnel-shaped tapering part.

In order to form the desired funnel-shaped widening, the first plastic tube part is efficiently pressed upon a truncated conical mandril surface, having longitudinally extending corrugations or grooves.

In order to produce different temperatures between the first funnel-shaped widened plastic tube part, directly adjoining the tube, and the end of said widened plastic tube part which is situated most outwardly, an insulation is mounted in between the two heating surfaces, which surfaces heat the two parts up to the desired temperature(s).

The invention also relates to a device for producing an overlapping connection or joint of plastic tubes by heatsealing. Said device comprises a plate with a heatable mandril whereupon a plastic tube part can be slid, which mandril has a truncated conical shape and serves for obtaining a funnel-shaped widening of a plastic tube part, the smallest periphery of the truncated conical mandril being at its extreme free end.

The plate expediently comprises a plurality of annular sections having different diameters, the outer sides of which sections, as seen from the center of the plate, have a truncated conical shape.

The truncated conical-shaped surfaces can be expediently provided with longitudinal grooves or corrugations, so as to improve the heatsealing process to be carried out.

In a very appropriate embodiment of the device in accordance with the invention, the plate has truncated conical annular sections at both sides, the outer wall of a section at one side tapering from the center of the plate, the inner wall of a section at the other side tapering toward the center of the plate.

In another advantageous embodiment there is an insulating layer in between the portion of an annular surface, which is situated most outwardly and the portion of an annular surface, situated most inwardly, so that the end of the funnel-shaped widening can be efficiently given a higher temperature than the successive part, which adjoins the plastic tube.

SURVEY OF THE DRAWINGS

FIG. 1 shows a cross sectional view of a first embodiment of a device for carrying out the method according to the invention;

FIG. 3 illustrates a detail according to arrow III in FIG. 2,

Figure 2:
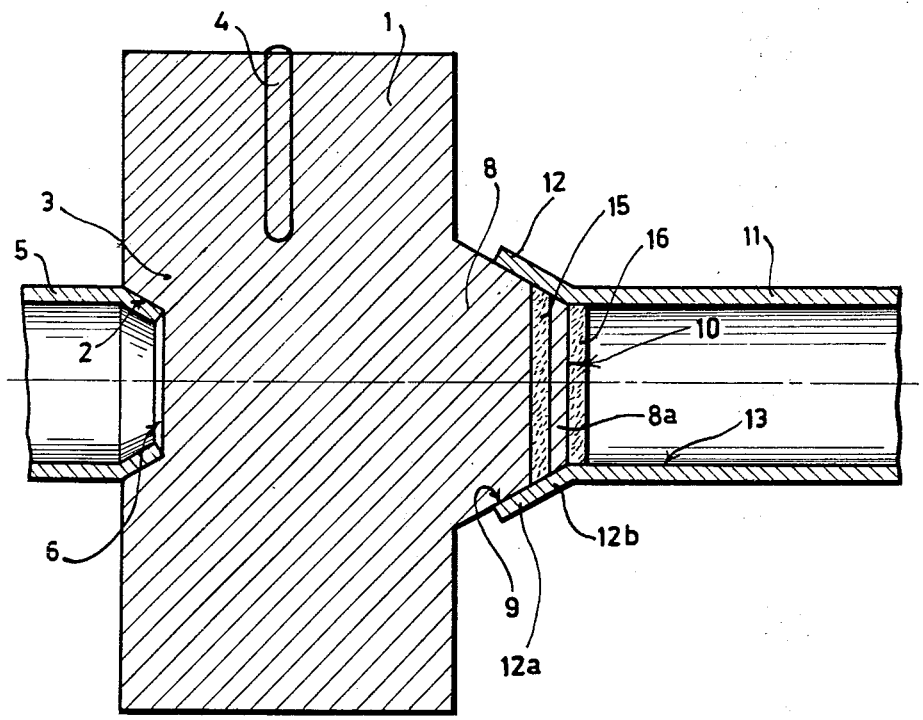
FIG. 2 shows a cross sectional view of a further embodiment.

FIG. 4 a view in the direction of arrow IV in FIG. 2.

DESCRIPTION OF PREFERRED EMBODIMENTS

FIG. 1 shows a plate 1 of aluminum, having at one side a conical recess 2, the wall 3 of which can be heated up to a temperature of 225° C. for polypropylene, by means of, for instance, resistance wires 4. The range of temperature, whereby a very good result can be obtained, varies from 200° to 250° C.

A second plastic tube part 5 is inserted into the conical recess 2, the outer side 6 of which tube part will become resilient and adhesive owing to a partial plastification of same. When said surface is adjoined by a second plasticized plastic surface, an appropriate heatseal or joint is realized.

The plate 1 further supports a mandril 8 for widening plastic tube parts, which mandril has a truncated conical surface 9, the extreme end 10 having the smallest diameter.

A first plastic tube part 11 is slid upon the heated mandril 8. Owing to the shape of said mandril 8, the extreme end of the first plastic tube part will get a widening 12 during the heating process.

So as to avois that the other portion 11 of the plastic tube part will become heated to a similar temperature as part 12, there may be an insulating layer 16, for instance of Pertinax, upon the truncated conical region of the mandril 8, which mandril 8 can also be heated by means of, for instance, resistance wires (not shown).

The angle of the inner side 9 of the funnel-shaped widening 12 with respect to the extension of the internal wall 13 of the plastic tube 11, amounts to maximally 30° and preferably to 20°. Expediently said angle amounts to some 10°. The angle is preferably more than 5° and very preferably more than 7°.

When a polypropylene material is used, the second tube part 5 can be pressed into a funnel-shaped widening 12 when the temperature of the surfaces 6 and 9 varies from about 200° C. to 250° C. Owing to this combination of features a very good joint is automatically produced.

In order to obtain a most effective joint the extreme end 12a of the widening should be heated up to a higher temperature than the portion 12b, directly joining the tube 17. While said end 12a is heated up to the sealing temperature, said portion 12b is therefore not given the temperature of the end 12a, but the temperature of the internal side of the part 12b will be lower and will only amount to some 100° C. to 110° C. So as to achieve the foregoing there may be a second insulation 15, which insulates part 8a of the mandril 8, so that different temperatures are produced for the two portions. Control of the heating member can take place by means of for instance controlers, like thermo-elements.

It has been proved that Klingerite is a very suitable insulating material.

However, at present the layers 15 and 16 are not used in the process of the invention.

FIG. 2 shows another preferred embodiment of a device for heatsealing plastic tubes. As can be seen, one side of the plate 1 comprises various first annular sections 17, 18, 19 and 20 with inner walls 17a, 18a, 19a and 20a, which taper toward the other side of the plate 1, whereas on the other side of the plate 1 there are second annular sections 21, 22, 23 and 24, having outer truncated conical surfaces 21a to 24a, which widen toward the exterior and serve to form funnel-shaped widenings in tubes of various different diameters. The surfaces 17a, 18a, 19a of the corresponding sections 17 to 19 taper toward the interior of the plate 1. The smallest diameter of the internal end of surface 17a is about equal to the smallest outer diameter of the external end of wall 21a of the annular section 21, which is also the case with the surfaces 22a and 18a and the surfaces 23a and 19a.

The plastic tube parts 11 and 3 to be connected, one part of which has a funnel-shaped widening 12 and the other part a tapering extremity 3a corresponding to the shape of the widening 12, are connected with each other by pushing portion 3a into the widening 12.

The walls 21a, 22a, and 23a, as well as the walls 17a, 18a and 19a, can expediently be provided with longitudinal grooves or corrugations 26 (FIG. 4).

The mandril 21, is subdivided into two parts 21b and 21c by means of an insulating material, in order to give various different temperatures to the parts of the surfaces 21a (See FIG. 3).

The method is particularly applied to small round thin-walled plastic tubes, (wall thickness 1–4 mm) of polyolefin material, preferably polyethylene or polypropylene. However, other heatweldable plastic tubes can also be used.

The wall thickness depends of course on the tube diameter e.g. the wall thickness amounts to 2,3 mm at a tube diameter of 110 mm.

The tubes to be connected have substantially the same diameter. Generally the angle of the outer side of the second pipe part 5 with the extension of the outer wall of said second part may preferably be about 10 to 15% smaller than the same angle of the funnel-shaped widening.

A tube of 50 mm diameter is widened and ready for use in 15–30 seconds.

What is claimed is:

1. An apparatus for connecting plastic tubes by heat sealing, comprising a plate with at least one heatable widening mandril forming a funnel shaped widening, one side of said plate comprising second annular sections having truncated conical outer walls which widen toward the exterior, the opposite side of said plate comprising first annular sections having inner truncated conical surfaces which taper toward the interior, whereby the smallest diameter of an inner conical surface at the inner extreme end of an annular section is equal to the smallest outer diameter at an outward extremity of an annular section at the opposite side of the plate, the top angle of said second annular conical outer walls [21A] to [24A] of said second annular sections [21], [22], [23], [24] and of the conical inner walls [17A], [18A], [19A] and [20A] of said first annular sections [17], [18], [19], [20] being comprised between 20 and 60 degrees and means connected to simultaneously heat said first and second annular sections.

2. The apparatus of claim 1 wherein there is an insulating layer in between the external part of the truncated conical surfaces and the internal part of the truncated conical surfaces.

* * * * *